United States Patent
Amdahl (10) Patent No.: US 9,438,471 B1
(45) Date of Patent: Sep. 6, 2016

(54) MULTI-BLADE NETWORK TRAFFIC MANAGEMENT APPARATUS WITH IMPROVED FAILURE HANDLING AND METHODS THEREOF

(71) Applicant: F5 Networks, Inc., Seattle, WA (US)

(72) Inventor: Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 167 days.

(21) Appl. No.: 13/731,114

(22) Filed: Dec. 31, 2012

Related U.S. Application Data (60) Provisional application No. 61/600,879, filed on Feb. 20, 2012.

(51) Int. Cl.
*H04L 12/26* (2006.01)
*H04L 12/24* (2006.01)

(52) U.S. Cl.
CPC .................. *H04L 41/0668* (2013.01)

(58) Field of Classification Search
CPC .................................................. G06F 11/2005
USPC ........................................................ 370/221
See application file for complete search history.

(56) References Cited

U.S. PATENT DOCUMENTS

| | | |
|---|---|---|
| 2003/0033563 A1 | 2/2003 | Cashman et al. |
| 2004/0024853 A1* | 2/2004 | Cates et al. ................. 709/223 |
| 2007/0168495 A1* | 7/2007 | Rothstein et al. ............ 709/224 |
| 2008/0049622 A1* | 2/2008 | Previdi et al. ................ 370/237 |
| 2008/0147858 A1 | 6/2008 | Prakash et al. |
| 2009/0144720 A1* | 6/2009 | Roush et al. ................. 717/171 |
| 2010/0251008 A1* | 9/2010 | Swildens .......................... 714/4 |
| 2011/0060855 A1 | 3/2011 | Kuschke et al. |

OTHER PUBLICATIONS

International Search Report and the Written Opinion for International Patent Application No. PCT/US2013/026061 (Date of Mailing: May 21, 2013).

* cited by examiner

*Primary Examiner* — Wei Zhao
(74) *Attorney, Agent, or Firm* — LeClairRyan, a Professional Corporation (57) ABSTRACT

A network traffic management cluster, medium and method is disclosed. The cluster includes a plurality of network traffic management devices, a backplane switch coupled to the network traffic management devices. A network traffic management device of the plurality includes a network interface and a hardwire failover switch. The switch has a primary bus coupled to the network interface and a secondary bus coupled to the backplane switch. The switch passes network traffic to the network interface via the primary bus when the network traffic management device is operational. The switch automatically redirects the network traffic to the backplane switch via the secondary bus when the network traffic management device experiences a failure. The backplane switch redistributes the redirected network traffic to one or more other network traffic management devices in the cluster.

21 Claims, 6 Drawing Sheets

FIG. 3B too_long

DETAILED DESCRIPTION

Figure 1:
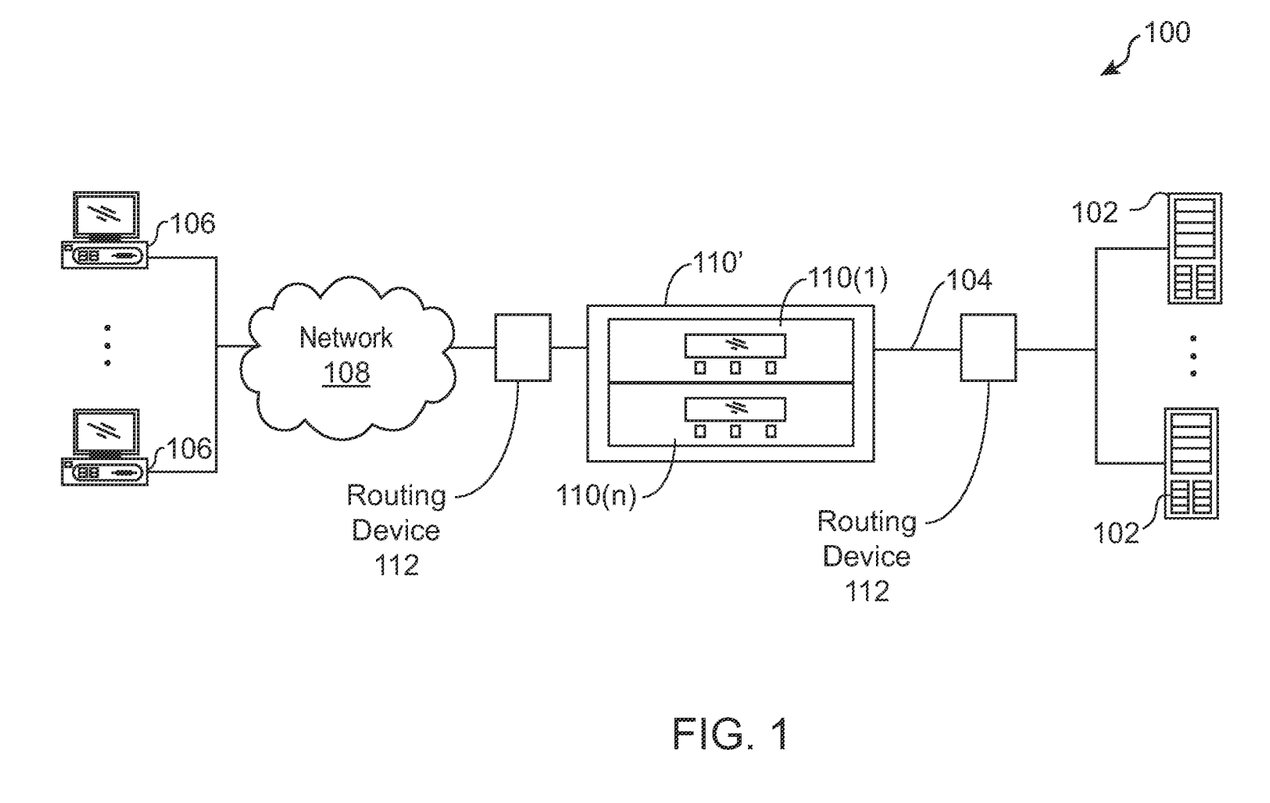

FIG. 1 is a diagram of an example system environment that includes a multi-blade network traffic management cluster chassis in accordance with an aspect of the present disclosure. The example system environment 100 includes one or more Web and/or non Web application servers 102 (referred generally as "servers"), one or more client devices 106, one or more network traffic management clusters 110, and one or more network routing devices 112. Although the network environment 100 is described and illustrated herein, it should be noted that the environment 100 is exemplary and other types and numbers of systems, devices, blades, components, and elements in other topologies can be used.

Client devices 106 comprise network computing devices capable of connecting to other network computing devices, such as network traffic management cluster 110' and/or servers 102. Such connections are performed over wired and/or wireless networks, such as network 108, to send and receive data, such as for Web-based requests, receiving server responses to requests and/or performing other tasks. Non-limiting and non-exhausting examples of such client devices 106 include personal computers (e.g., desktops, laptops), tablets, smart televisions, video game devices, mobile and/or smart phones and the like. In an example, client devices 106 can run one or more Web browsers that provide an interface for operators, such as human users, to interact with for making requests for resources to different web server-based applications and/or Web pages via the network 108, although other server resources may be requested by client devices.

The servers 102 comprise one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. It should be noted that while only two servers 102 are shown in the environment 100 depicted in FIG. 1, other numbers and types of servers may be utilized in the environment 100. It is contemplated that one or more of the servers 102 may comprise a cluster of servers managed by one or more network traffic management clusters 110. In one or more aspects, the servers 102 may be configured implement to execute any version of Microsoft® IIS server, RADIUS server, DIAMETER server and/or Apache® server, although other types of servers may be used.

Network 108 comprises a publicly accessible network, such as the Internet, which is connected to the servers 102, client devices 106, and the network traffic management cluster 110'. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols, as well as other protocols. As per TCP/IP protocols, requests from the requesting client devices 106 may be sent as one or more streams of data packets over network 108 to the network traffic management cluster 110' and/or the servers 102. Such protocols can be utilized by the client devices 106, network traffic management cluster 110' and the servers 102 to establish connections, send and receive data for existing connections, and the like.

Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols. Network devices such as client devices, 106, servers 102, network traffic management cluster 110', routers, switches, hubs, gateways, bridges, cell towers and other intermediate network routing devices may act within and between LANs and other networks to enable messages and other data to be sent between network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. Thus, the network 108 is configured to handle any communication method by which data may travel between network devices.

LAN 104 comprises a private local area network that allows communications between the one or more network traffic management clusters 110 and one or more servers 102 in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As shown in FIG. 1, the network traffic management cluster 110' communicates with one or more intermediate network routing devices 112. In the example environment 100 in FIG. 1, the network management cluster 110' communicates with one or more client side intermediate network routing devices 112 as well with one or more server side intermediate network routing devices 112. It is contemplated that the network traffic management cluster 110' need not communicate with both client and server side intermediate routing devices and can be enabled to communicate with either a client or server side intermediate routing device. It should be noted that reference numeral 112 is used herein when generally describing the intermediate network routing device, which may be construed to be applied to either or both of the one or more client and server side intermediate network routing devices 112. In an aspect, the intermediate network routing device 112 may be an unmanaged switch, repeater, router, and/or hub. In an aspect, the intermediate network routing device 112 can be a managed and/or intelligent switch.

As shown in the example environment 100 depicted in FIG. 1, the one or more network traffic management clusters 110 are interposed between client devices 106 with which it communicates with via network 108 and servers 102 with which it communicates with via LAN 104. Generally, the network traffic management cluster 110' has one or more network traffic management devices 110(1)-110(n) which manage network communications, such as client requests and server responses, via the network 108 between the client devices 106 and the servers 102. For example, the network traffic management devices 110(1)-110(n) of the network traffic management cluster 110' may manage the network communications by performing several network traffic related functions including, but not limited to, load balancing, access control, optimizing, securing and accelerating the network traffic between client devices 106 and servers 102 as well as validating HTTP requests.

Figure 2A:
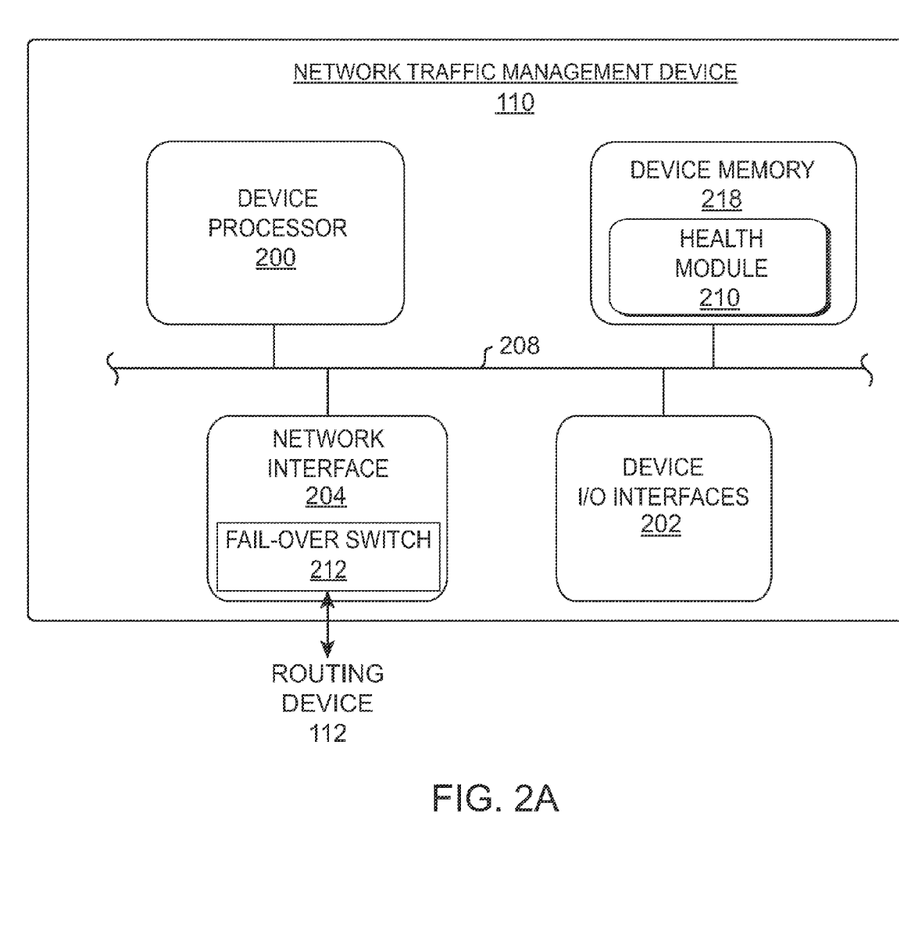
FIG. 2A is a block diagram of a network traffic management device of a network traffic management cluster in accordance with an aspect of the present disclosure.

FIG. 2A is a block diagram of a network traffic management device of a network traffic management cluster in accordance with an aspect of the present disclosure. As shown in FIG. 2A, the example network traffic management device 110(n) includes one or more device processors 200, one or more device I/O interfaces 202, one or more network interfaces 204, and one or more device memories 206, which are coupled together by one or more bus 208. It should be noted that the network traffic management device 110(n) can be configured to include other types and/or numbers of components and is thus not limited to the configuration shown in FIG. 2A.

Device processor 200 of the network traffic management device 110(n) comprises one or more microprocessors configured to execute computer/machine readable and executable instructions stored in the device memory 206. Such instructions, when executed by one or more processors 200, implement general and specific functions of the network traffic management device 110(n), including the inventive process described in more detail below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured according to the teachings as described and illustrated herein.

Device I/O interfaces 202 comprise one or more user input and output device interface mechanisms. The interface may include a computer keyboard, mouse, display device, and the corresponding physical ports and underlying supporting hardware and software to enable the network traffic management device 110(n) to communicate with other network devices in the environment 110(n). Such communications may include accepting user data input and providing user output, although other types and numbers of user input and output devices may be used. Additionally or alternatively, as will be described in connection with network interface 204 below, the network traffic management device 110(n) may communicate with the outside environment for certain types of operations (e.g. smart load balancing) via one or more network management ports.

Network interface 204 comprises one or more mechanisms that enable the network traffic management device 110(n) to engage in network communications over the LAN 104 and the network 108 using one or more of a number of protocols, such as TCP/IP, HTTP, UDP, RADIUS and DNS. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110(n) with other network devices, such as another network traffic management device in the cluster 110', client devices 106 and/or servers 102. Moreover, the interface 204 may include certain physical ports dedicated to receiving and/or transmitting certain types of network data, such as device management related data for configuring the network traffic management device 110(n) or client request/server response related data.

Bus 208 may comprise one or more internal device component communication buses, links, bridges and supporting components, such as bus controllers and/or arbiters. The bus 208 enables the various components of the network traffic management device 110(n), such as the processor 200, device I/O interfaces 202, network interface 204, and device memory 206, to communicate with one another. However, it is contemplated that the bus 208 may enable one or more components of the network traffic management device 110(n) to communicate with one or more components in other network devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110(n).

Device memory 206 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by a computing or specially programmed network device, such as the network traffic management device 110(n).

Such storage media includes computer readable/processor-executable instructions, data structures, program modules, or other data, which may be obtained and/or executed by one or more processors, such as device processor 200. Such instructions, when executed, allow or cause the processor 200 to perform actions, including performing the inventive processes described below. The memory 206 may contain other instructions relating to the implementation and operation of an operating system for controlling the general operation and other tasks performed by the network traffic management device 110(n).

Figure 2B:
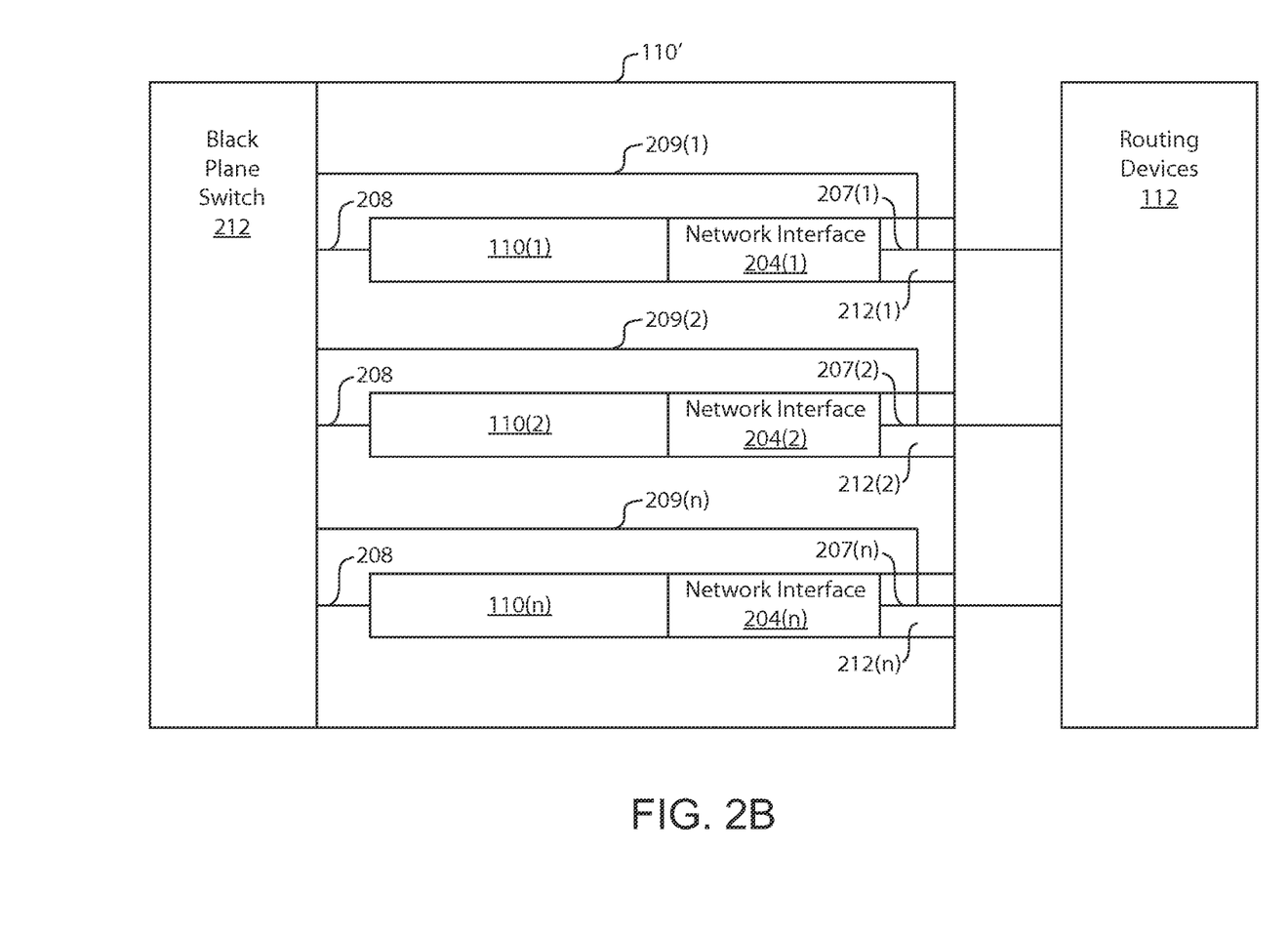
FIGS. 2B-2C illustrate block diagrams of a network traffic management cluster chassis containing different backplane networks in accordance with aspects of the present disclosure.
Figure 2C:
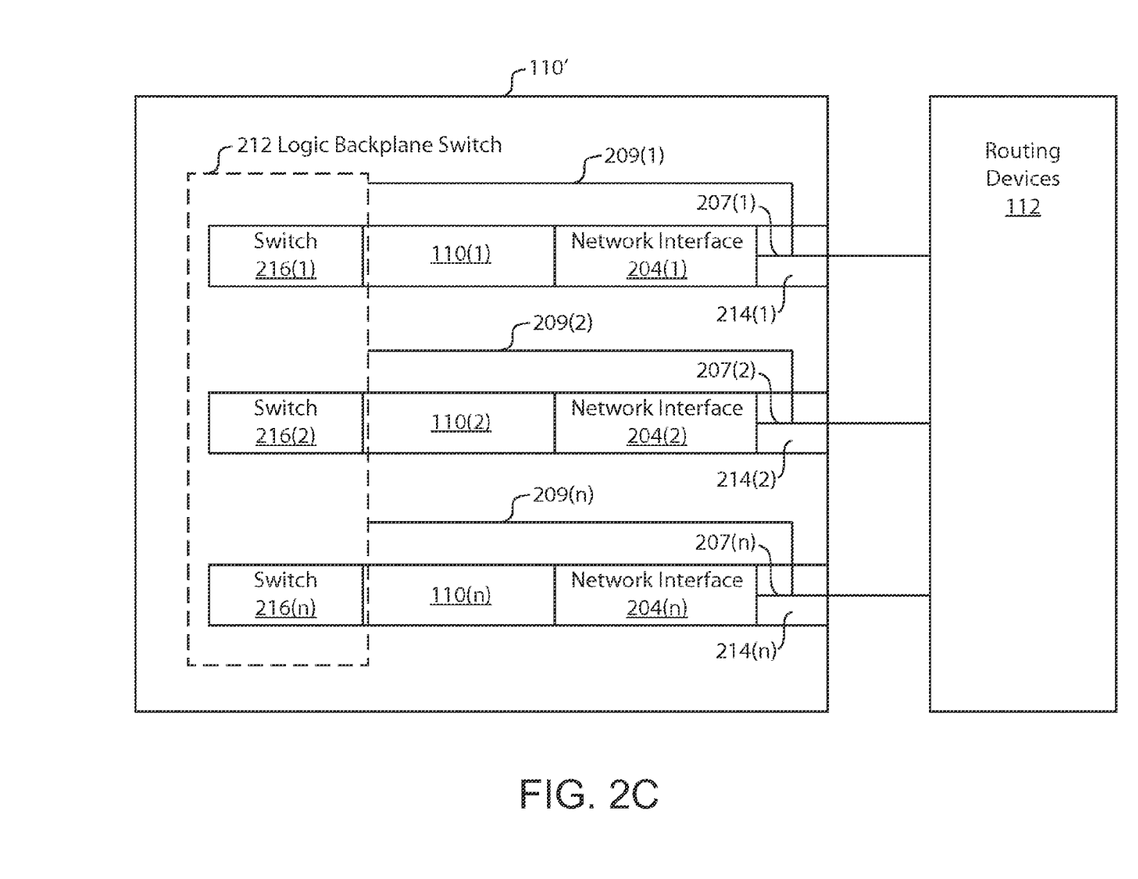

FIGS. 2B-2C illustrate block diagrams of a network traffic management cluster chassis containing different backplane networks in accordance with aspects of the present disclosure. In the example aspect shown in FIGS. 2B and 2C, the network traffic management cluster 110' is a multi-blade chassis comprising a plurality of network traffic management devices 110(1)-110(n). It should be noted that although only three network traffic management devices 110(1)-110(n) are shown in FIGS. 2B and 2C, more or less than three network traffic management devices can be implemented in the cluster chassis 110'. Additionally, the cluster 110' includes a backplane switch 212 configured to communicate with each available network traffic management device 110(1)-110(n) via bus 208 to create a backplane network.

As shown in FIGS. 2B and 2C, each of the network traffic management devices 110(1)-110(n) send and receive network traffic with one or more network routing devices 112 external to the cluster chassis 110' via respective network interfaces 204(1)-204(n). In an aspect, each network traffic management device 110(1)-110(n) includes a hardwire failover switch 214(1)-214(n) coupled to the network interface of its respective network traffic management device 110(1)-110(n) as well as the backplane switch 212. Each failover switch 214(1)-214(n) includes a physical primary bus 207(1)-209(1) by which network traffic is passed to the network interface 204(1)-204(n). In addition, each failover switch 214(1)-214(n) includes a physical secondary bus 209(1)-209(n) that is coupled directly to the backplane switch 212. Each network traffic management device's failover switch 214(1)-214(n) is configured to perform a hardwire switching process from the primary bus 207 to the secondary bus 209 in the event of a failure in its respective network traffic management device 110(1)-110(n). In particular, the failover switch 214 is a passive system in that terminates or shorts the circuit associated with the primary bus 207 and activates the circuit including the secondary bus 209 when a failure event is detected by the network interface 204.

In an aspect, some or all of the network traffic management devices 110(1)-110(n) implement the health module 210 to monitor health data of the network traffic management device and provides that health data to the network interface 204. In an aspect, the health module 210 implements advanced checks like, "Is there a route to an external address?" or "Is a certain process running correctly?" Health data monitored by the health module 210 is translated to a heart beat message sent to the network interface if the system is "Ok". In contrast, the health module 210 does not send a heart beat message or sends an explicit failure message to the network interface 204 in the event that there is a failure event. Accordingly, the network interface need only to detect if too many heart beats have been missed or if an explicit "Failure" message has been received from the health module 210 to determine that a failure event has occurred. Once the health module 210 determines that the network traffic management device 110 has experienced a failure event, the failover switch 214 performs the hardwire failover switching process from the primary bus 207 to the secondary bus 209. As a result, all network traffic previously handled by the now-failed network traffic management device 110 is redirected via secondary bus 209 to the backplane switch 212.

In an aspect, the backplane switch 212 is configured to distribute traffic flows among the available network traffic management devices 110(1)-110(n) in the cluster chassis 110'. Additionally, the backplane switch 212 is configured to handle network traffic (intended for failed network traffic management device) received over the secondary bus 209 and redistribute it to one or more other available network traffic management devices 110(1)-110(n).

In an aspect, as shown in FIG. 2B, the backplane switch 212 is a hardware based intelligent switch which communicates with the processors 200(1)-200(n) and the switching modules 210(1)-210(n) of the network traffic management devices 110(1)-110(n) via one or more bus 208. The backplane switch 212 can be configured to an effective or logical disaggregator that implements policies established by a manufacturer and/or an administrator to accordingly route and distribute network traffic among the available network traffic management devices 110(1)-110(n). Such load balancing and redistribution techniques include, but are not limited to, randomly distributing the network traffic, distributing the network traffic by a round-robin technique, mirroring the traffic to all ports, hash based distribution of the traffic to healthy available network traffic management devices any other number or type of policy, rule or distribution techniques. In another aspect, the backplane switch 212 can optionally examine the data packets of the network traffic received via the secondary bus 209 and examine the link state data of the failed network interface to detect system failures. The backplane switch 212 can then use the link state data and the failure data as part of the load balancing rules it implements to redistribution of the network traffic to the one or more available network traffic management devices.

As shown in FIG. 2C, the backplane switch 212 comprises a plurality of hardware and/or software based stackable switches 216(1)-216(n) implemented by the network traffic management devices 110(1)-110(n). As shown in FIG. 2C, the stackable switches 216(1)-216(n) are connected to and communicate data with one another to effectively operate as a backplane switch 212. As shown in FIG. 2C, at least one of the stackable switches 216 is configured to receive network traffic from one or more external network routing devices 112, wherein that stackable switch 216 is configured to distribute the network traffic to one or more other network traffic management devices 110(1)-110(n) via their corresponding stackable switches 21C.

In an aspect, the backplane switch 212 may be configured to replicate network traffic for one or more network traffic management devices 110(1)-110(n) to one or more other network traffic management devices 110(1)-110(n). Accordingly, in this aspect, a particular network traffic management device 110(1)-110(n) may be configured to process at least a subset of traffic replicated among one or more available network traffic management devices 110(1)-110(n) based on one or more filtering rules. Thereby, the backplane switch's 212 determination as to which available network traffic management devices 110(1)-110(n) are to process the redirected network traffic is shifted to the available network traffic management devices 110(1)-110(n) from the backplane switch 212, as the backplane switch 212 merely replicates the redirected network traffic to the available network traffic management devices 110(1)-110(n).

Figure 3A:
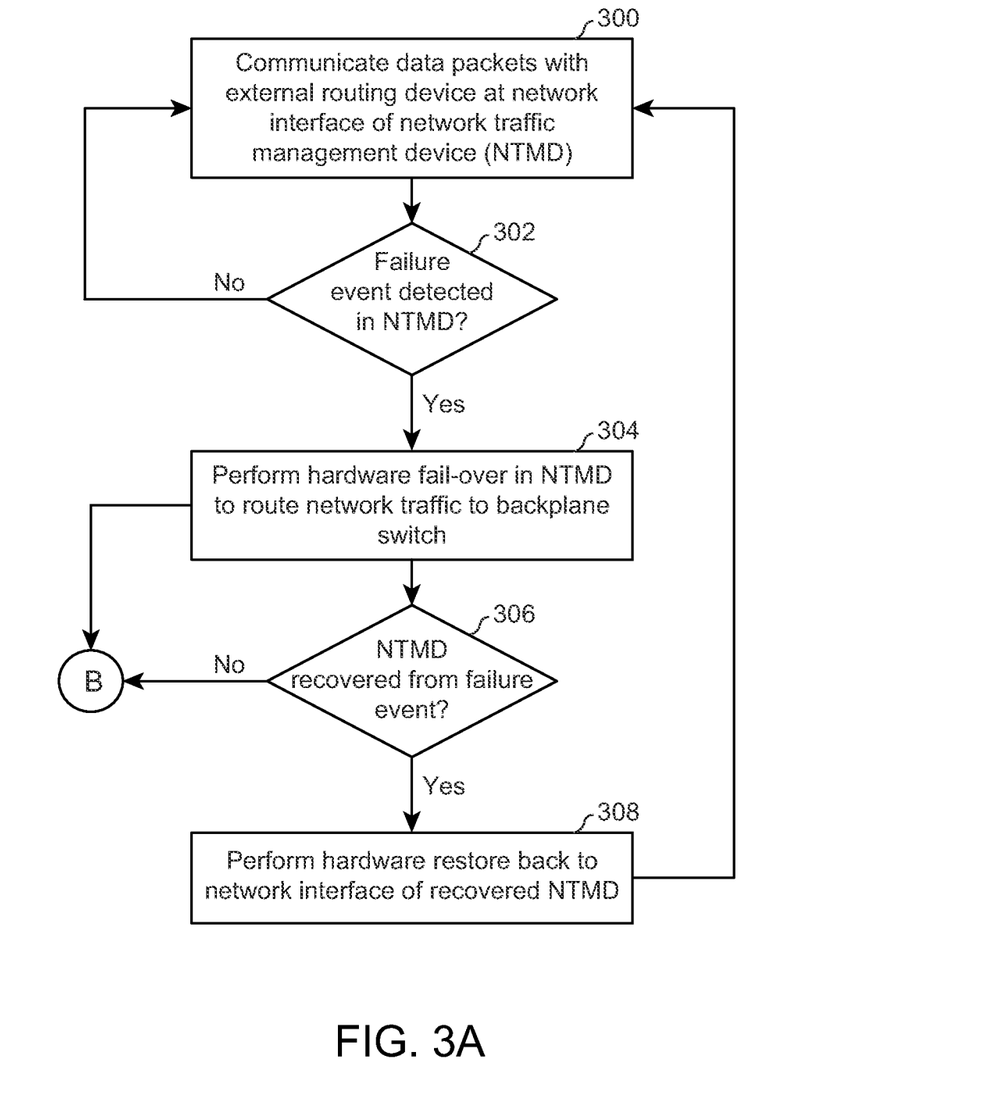
FIG. 3A illustrates a flow chart describing a hardwire failover switching process performed by a network traffic management device in accordance with an aspect of the present disclosure.

FIG. 3A illustrates a flow chart describing a hardwire failover switching process performed by a network traffic management device in accordance with an aspect of the present disclosure. As shown in FIG. 3A, the network interface 204 of a network traffic management device 110 communicates data packets or network traffic with the external routing device 112 over a network (Block 300). This process repeats until the network traffic management device 110, based on the monitored health data, determines that it is experiencing a failure event, such as power loss, connectivity loss or other action that causes it to no longer be able to effectively handle network traffic with the routing device 112 (Block 302).

Upon the network traffic management device 110 determining that it is experiencing a failure event, the failover switch 214 performs a hardwire failover switch from its primary bus 207 to the secondary bus 209, wherein network traffic with respect to routing device 112 is automatically sent via the secondary bus 209 directly to the backplane switch 212 (Block 304). Thereafter, network traffic for the failed network traffic management device 110 is sent directly to the backplane switch 212 over secondary bus 209 instead of the primary bus 207 to the now unavailable network traffic management device 110 (Block B).

In an aspect, the failed network traffic management device 110 and/or the backplane switch 212 may be configured to automatically send a signal to one or more other network traffic management devices 110 in the cluster 110' and notifying them of the failed network traffic management device 110.

This process continues until the network traffic management device 110 determines that it has recovered from the failure event (Block 306). Once the network traffic management device 110 has recovered, the failover switch 214 performs a reverse hardwire failover action from the secondary bus 209 to the primary bus 207 (Block 308). Once the primary bus 207 is activated, the network traffic management device 110 is thereafter able to handle the network traffic with the routing device 112 (Block 300).

Figure 3B:
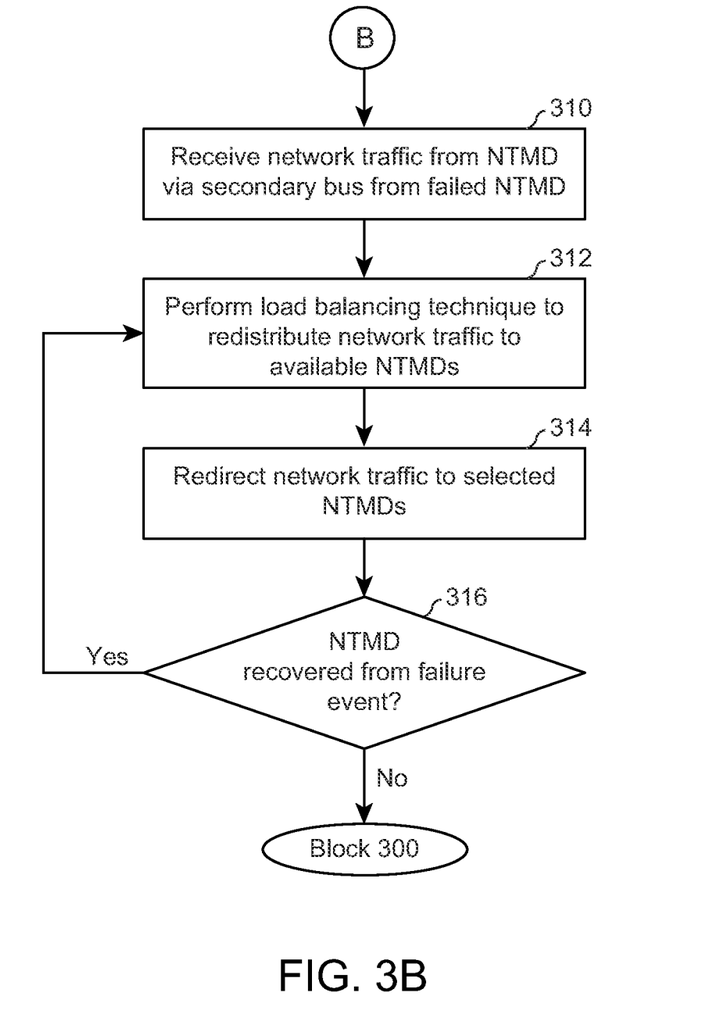
FIG. 3B illustrates a flow chart describing a process performed by a backplane switch in accordance with an aspect of the present disclosure.

FIG. 3B illustrates a flow chart describing a process performed by a backplane switch in accordance with an aspect of the present disclosure. As shown in FIG. 3B, the backplane switch 212 begins receiving network traffic for a network traffic management device 110 via its secondary bus 209 (Block 310). The backplane switch 212 thereafter performs preestablished load balancing and/or redistribution technique(s) to redistribute the failed network traffic management device's network traffic to one or more other available network traffic management devices in the cluster 110' (Block 312). The backplane switch 212 thereafter redirects the network traffic to the one or more available network traffic management devices 110(1)-110(n) in conformance with the preestablished load balancing/redistribution policies (Block 314). This process continues, as indicated in Block 316, until the backplane switch 212 no longer receives the network traffic via the secondary bus 209, wherein the process reverts to Block 300 in FIG. 3A.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A network traffic management computing device cluster, the cluster comprising:
    a backplane switch coupled to a plurality of network traffic management computing devices, wherein each of the plurality of network traffic management computing devices further comprises:
    a network interface;
    a hardwire failover switch comprising a primary bus coupled to the network interface and a secondary bus coupled to the backplane switch, the hardwire failover switch configured to pass network traffic to the network interface via the primary bus when the network traffic management device is operational;
    at least one processor or configurable hardware logic;
    a memory coupled to at least one of the configurable hardware logic to implement or the processor which is configured to be capable of executing, programmed instructions comprising and stored in the memory to:
        monitor network traffic sent or received by the plurality of network traffic management computing devices, wherein the network traffic comprises heartbeat messages sent at a predetermined rate to indicate a healthy operational status in the plurality of network traffic management computing devices;
        detect when one of the plurality of network traffic management computing devices experiences a failure event, based on a measured rate of the heartbeat messages sent from the one of the plurality of network traffic management computing devices falling below the predetermined rate;
        perform a failover to redirect the network traffic from the one of the plurality of network traffic management devices that experienced the failure event to at least one of the plurality of network traffic management computing devices in the cluster that did not experience a failure event, when a failure event is detected, wherein a failure event halts or disrupts the sending or receiving of network traffic by at least one of the plurality of network traffic management computing devices.

2. The cluster of claim 1 wherein the backplane switch is configured to redistribute the redirected network traffic to the at least one of the plurality of network traffic management computing devices that did not experience a failure event, based on one or more rules.

3. The cluster of claim 2, wherein the one or more rules comprise at least one rule based on a hash based distribution technique.

4. The cluster of claim 2 wherein the backplane switch is further configured to:
    examine link state information of the network interface of the network traffic management computing device that experienced a failure event; and
    perform redistribution of the network traffic to the at least one of the plurality of network traffic management computing devices that did not experience a failure event, based on the examined link state.

5. The cluster of claim 1 wherein the backplane switch is further configured to replicate the redirected network traffic to the at least one of the network traffic management devices that did not experience a failure event and wherein the configurable hardware logic is further configured to implement or the processor is further configured to be capable of executing, programmed instructions comprising and stored in the memory to:
    replicate the redirected network traffic to the at least one of the plurality of network traffic management computing devices that did not experience a failure event; and filter at least a subset of the replicated network traffic based on one or more filtering rules.

6. The cluster of claim 1 wherein the configurable hardware logic is further configured to implement or the processor is further configured to be capable of executing, programmed instructions comprising and stored in the memory to:

send a failure message associated with the monitored network traffic when one of the plurality of network traffic management computing devices experiences the failure event.

7. The cluster of claim 6 wherein the configurable hardware logic is further configured to implement or the processor is further configured to be capable of executing programmed instructions comprising and stored in the memory to:

send an indication that the one of the plurality of network traffic management computing devices has experienced a failure event when the heartbeat messages have not been received by the at least one of the plurality of network traffic devices that did not experience a failure event, within a predetermined time period.

8. A method comprising:

monitoring, by a network traffic management computing device cluster, network traffic sent or received by a plurality of network traffic management computing devices wherein the network traffic comprises heartbeat messages sent at a predetermined rate to indicate a healthy operational status in the plurality of network traffic management computing devices;

detecting, by the network traffic management computing device cluster, when one of the plurality of network traffic management computing devices experiences a failure event, based on a measured rate of the heartbeat messages sent from the one of the plurality of network traffic management computing devices falling below the predetermined rate;

performing, by the network traffic management computing device cluster, a failover to redirect the network traffic comprising data packets from the one of the plurality of network traffic management computing devices that experienced the failure event to the at least one of the plurality of network traffic management computing devices that did not experience a failure event, when a failure event is detected wherein a failure event halts or disrupts the sending or receiving of network traffic by at least one of the plurality of network traffic management computing devices.

9. The method of claim 8 wherein the redirecting further comprises:

redistributing, by the network traffic management computing device cluster, the network traffic to the at least one of the plurality of network traffic management computing devices that did not experience a failure event, based on one or more rules.

10. The method of claim 9, wherein the one or more rules comprise at least one rule based on a hash based distribution technique.

11. The method of claim 8, further comprising:

examining, by the network traffic management computing device cluster, link state information of the one of the plurality of network traffic management computing devices that experienced a failure event; and performing, by network traffic management computing device cluster, redistribution of the network traffic to the at least one of the plurality of network traffic management computing devices that did not experience a failure event, based on the examined link state information.

12. The method of claim 8 further comprising replicating, by the network traffic management computing device cluster, the redirected network traffic to the at least one of the plurality of network traffic management devices that did not experience a failure event; and filtering, by the network traffic management computing device cluster, at least a subset of the replicated network traffic based on one or more filtering rules.

13. The method of claim 8 further comprising:

sending, by the network traffic management computing device cluster, a failure message associated with the network traffic when one of the plurality of network traffic management computing devices experiences the failure event.

14. The method of claim 13 further comprising:

sending, by the network traffic management computing device cluster, an indication that the one of the plurality of network traffic management computing devices has experienced a failure event when the heartbeat messages have not been received by the at least one of the plurality of network traffic management devices that did not experience a failure event, within a predetermined time period.

15. A non-transitory computer readable medium having stored thereon instructions for managing a network traffic management computing device cluster, comprising machine executable code which when executed which when executed by at least one processor, causes the processor to perform steps comprising:

monitoring network traffic sent or received by a plurality of network traffic management computing devices in a network traffic management computing device cluster, wherein the network traffic comprises heartbeat messages sent at a predetermined rate to indicate a healthy operational status in the plurality of network traffic management computing devices;

detecting when one of the plurality of network traffic management computing devices experiences a failure event, based on a measured rate of the heartbeat messages sent from the one of the plurality of network traffic management computing devices falling below the predetermined rate; and performing a failover to redirect the network traffic from the one of the plurality of network traffic management computing devices that experienced the failure event to at least one of the plurality of network traffic management computing devices that did not experience a failure event, when a failure event is detected, wherein a failure event halts or disrupts the sending or receiving of network traffic by at least one of the plurality of network traffic management computing devices.

16. The medium of claim 15, further having stored thereon instructions that when executed by the processor cause the processor to perform steps for the redirecting further comprising:

redistributing the network traffic to the at least one of the plurality of network traffic management computing devices that did not experience a failure event, based on one or more rules.

17. The medium of claim 16, wherein the one or more rules comprise at least one rule based on a hash based distribution technique.

18. The medium of claim 15, further having stored thereon instructions that when executed by the processor cause the processor to perform steps further comprising:
   examining link state information of the one of the plurality of network traffic management computing devices that experienced a failure event; and
   performing redistribution of the network traffic to the at least one of the plurality of network traffic management computing devices that did not experience a failure event based on the examined link state information.

19. The medium of claim 15 further having stored thereon instructions that when executed by the processor cause the processor to perform steps further comprising:
   replicating the redirected network traffic to the at least one of the plurality of network traffic management computing devices that did not experience a failure event; and
   filtering at least a subset of the replicated network traffic based on one or more filtering rules.

20. The medium of claim 15 further having stored thereon instructions that when executed by the processor cause the processor to perform steps further comprising:
   sending a failure message associated with the monitored network traffic when one of the plurality of network traffic management computing devices experiences the failure event.

21. The medium of claim 20 further having stored thereon instructions that when executed by the processor cause the processor to perform steps further comprising:
   sending an indication that the one of the plurality of network traffic computing devices has experienced a failure event when the heartbeat messages have not been received by the at least one of the plurality of network traffic management devices that did not experience a failure event, within a predetermined time period.

* * * * *